June 18, 1940. J. HALTENBERGER 2,204,989
SUSPENSION MEANS FOR DRIVE AXLES
Filed May 16, 1938 2 Sheets-Sheet 2

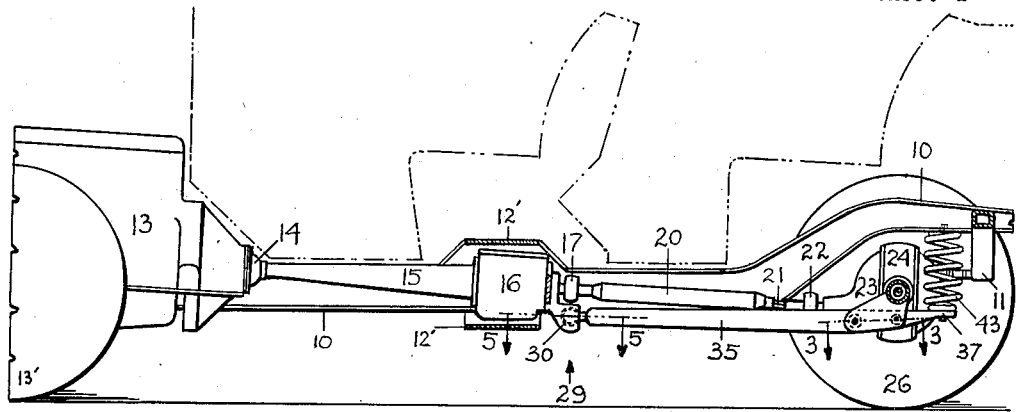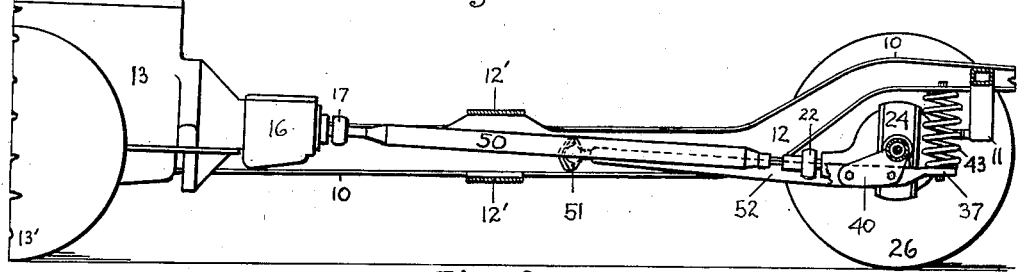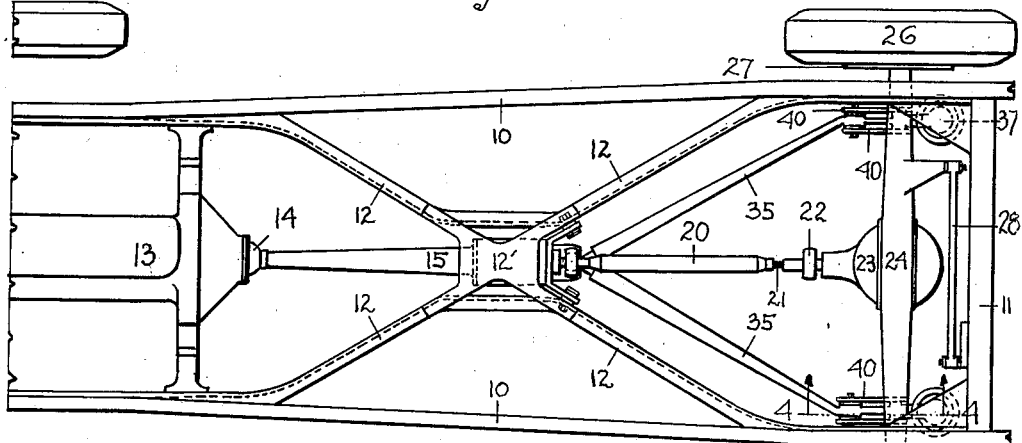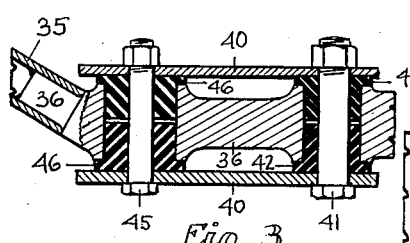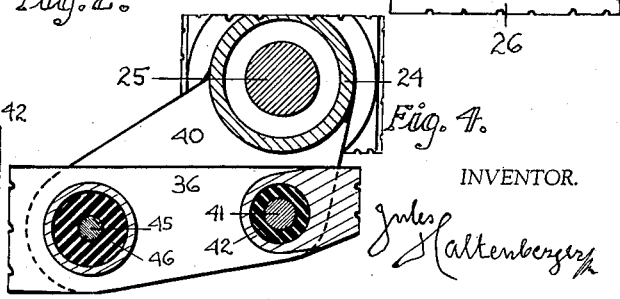

INVENTOR.
Jules Haltenberger

Patented June 18, 1940

2,204,989

UNITED STATES PATENT OFFICE 2,204,989

SUSPENSION MEANS FOR DRIVE AXLES

Jules Haltenberger, Ann Arbor, Mich.

Application May 16, 1938, Serial No. 208,292

7 Claims. (Cl. 180—73)

My invention pertains to automobile driving systems and it is a modification of my co-pending application, Serial No. 180,496, filed Dec. 18, 1937, for "Suspension means for drive axle."

It has been proposed to drive an automobile by a wishbone. In the proposals, applicant is aware of, the drive was in association with a differential housing directly mounted on the frame, and the drive was unyielding (in effect equal to a torque tube drive). It is here proposed to use a wishbone drive in driving force-yielding association on an integral automobile driving axle.

A further object of my invention is to provide a construction where the wishbone to axle connection is not burdened by the forces resulting from axle tilting, however, yieldingly responding to all the other forces of a usual Hotchkiss drive.

A further object is to provide a wishbone or distance rod drive that is adaptable to the automobile frames or frameless automobiles now in production without the necessity of major alteration or large openings therein and is applicable with the use of a half, full length, three-quarter propeller shaft or two half propeller shafts.

A further object is to gain full use of the rear universal joint without permitting an excess working angle, while abstaining from interference with the body design, running board or running board-less design.

Further objects of my invention will appear as the description proceeds.

The accompanying drawings illustrate my invention.

Figure 5:
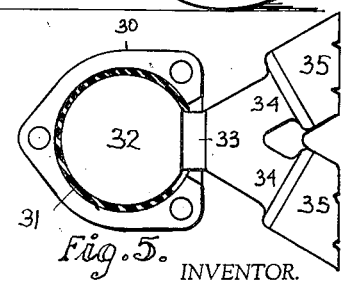

Here, Fig. 1 is a longitudinal section of an automobile using a half propeller shaft; Fig. 2 is a plan view of the chassis; Fig. 3 is a section substantially on line 3—3 of Fig. 1, here illustrated in a larger scale; Fig. 4 is a section substantially on line 4—4 of Fig. 2, here illustrated in a larger scale; Fig. 5 is a section substantially on line 5—5 of Fig. 1, here illustrated in a larger scale.

Figure 7:
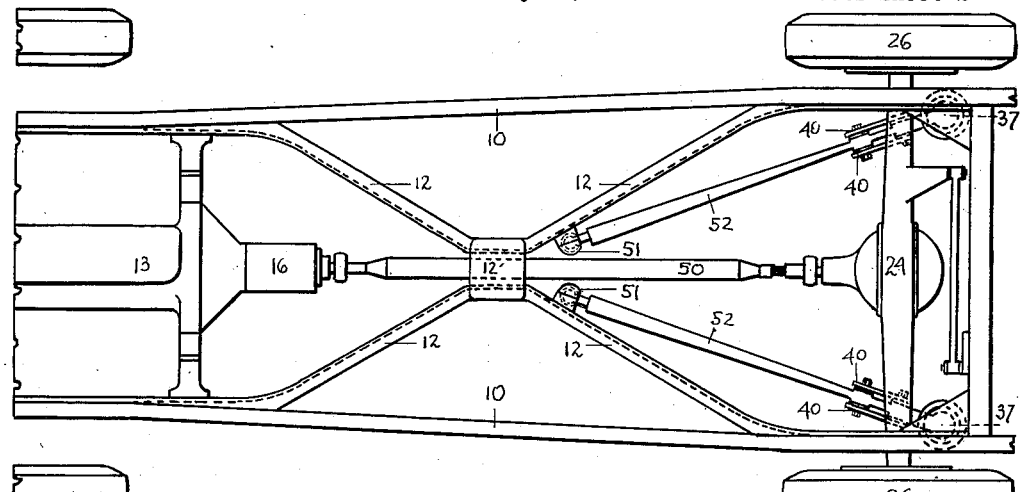
Figure 8:
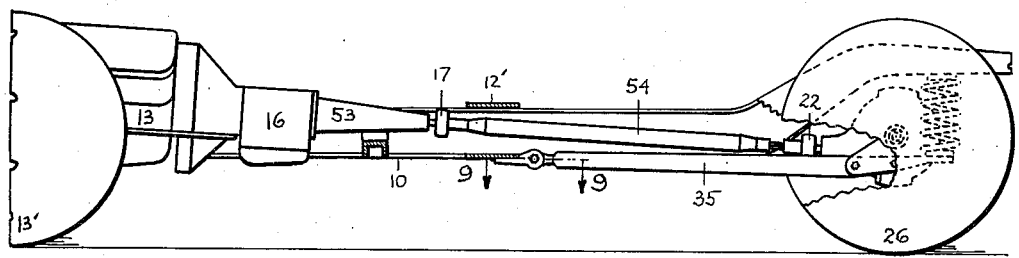
Figure 10:
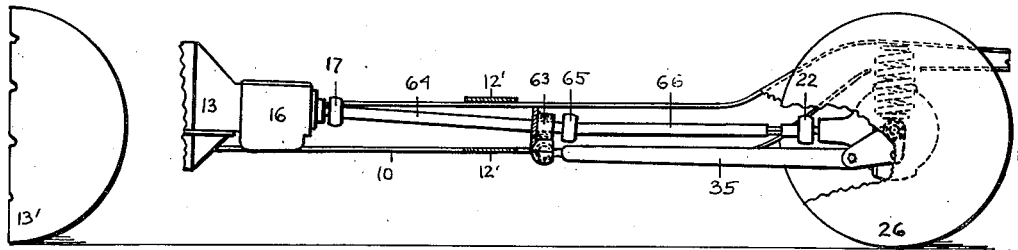
Figure 9:
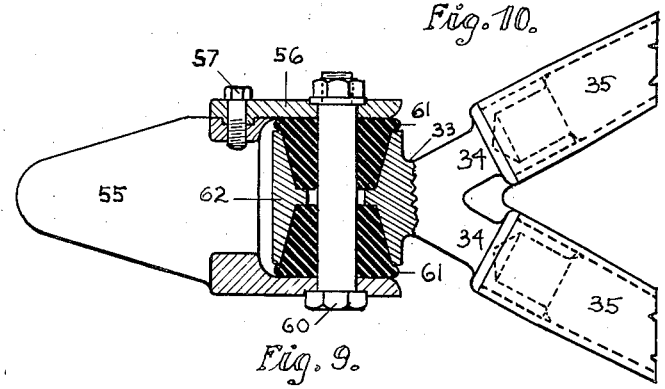

Fig. 6 is a modification of the invention showing a longitudinal section of an automobile using a full length propeller shaft; Fig. 7 is a plan view of the automobile illustrated in Fig. 6; Fig. 8 is a modification of the invention showing a longitudinal section of an automobile using a three-quarter propeller shaft; Fig. 9 is a section substantially on line 9—9 of Fig. 8, here illustrated in a larger scale; Fig. 10 is a modification of the invention illustrating a longitudinal section of an automobile using two half propeller shafts.

Referring to Figs. 1 to 5 inclusive it will be seen that frame side members 10 are connected by a rear cross member 11, and X members 12 having central connecting fish plates 12'. In the frame near the front wheel 13' is mounted a usual engine flywheel and clutch power plant unit 13, in the usual manner. At the rear of this unit a universal joint is surrounded by a driving spherical joint 14, coupling a transmission front extension 15 and change speed transmission 16 respectively. (The power plant, transmission front extension and transmission mounting method will be presented and claimed in a separate application.)

The rear of transmission 16 is provided with a usual propeller shaft front universal joint 17 and thereto is coupled a half propeller shaft 20, terminating in a usual slide joint 21.

Slide joint 21 is arranged to drive a rear universal joint 22 on differential housing 23, constituting a part of power axle 24 which carries axle shafts 25 and driving wheels 26 with brake drums 27 therein.

For the lateral location of the power axle and frame, preferably a rubber bushed conventional lateral tie rod 28 is provided connecting the axle to cross member 11.

At the rear of transmission 16 and integral therewith (indicated generally at 29) is provided a socket 30 for a ball and socket joint. As is clear from Fig. 5, it is provided with a rubber liner 31, ball 32, neck 33, and rearwardly the neck terminates in prongs 34. To them as by welding are secured the hollow wishbone tubes 35. As is clear from Fig. 3, these tubes terminate in forgings 36 (passing under the axle 24) and carry spring supporting plates 37 at their rear extremities.

As is clear from the drawings, the wishbone unit is universally connected in the front to the transmission housing at 29 for propulsion and deceleration transfer forces, but it is free to tilt.

The primary and load-carrying connection between the wishbone and axle is preferably positioned directly under the axle. Here a pair of spaced driving plates 40 are positioned near their respective driving wheels and are secured to the axle 24 as by electric butt welding. These plates straddle the forgings 36 and are provided with load-carrying bolts 41 passing through relatively hard load carrying flanged rubber bushings 42, imbedded in forgings 36.

The wishbone front support at 29 being (indirectly) on the frame, by mounting a coil spring 43 between the wishbone (plate 37) and the frame side members 10, the frame is yieldingly supported.

In view that the primary and load-carrying connection between the wishbone and axle is under the power axle, at standstill the axle will be located. To create a yielding response to torque and brake reaction I provide a relatively soft rubber connection. As is clear from Figs. 3 and 4, driving plates 40 have a forward extension, carrying reaction bolts 45 passing through relatively soft reaction flanged rubber bushings 46, imbedded in forgings 36.

To facilitate the assembly and compressing of the rubber bushings I prefer to make one of the driving plates 40 thinner than the other one. The wishbone tubes 35 and the parts integral therewith shall be referred to as a wishbone or distance rod.

The above described construction is simple and yielding. It isolates noise transfer and vibrations and gives free control of yielding to the driving system by controlling the relative softness of the reaction rubber bushings.

To simplify the presentation only the specific features of the modifications will be described.

Figs. 6 and 7 illustrate a modification of the invention. Here the power unit 13 directly supports the transmission 16 and therefore it has a full length propeller shaft 50. Whereas it would be easy to mount a wishbone front joint under the lower center fish plate 12', as described in connection with Figs. 1 to 5, here I might prefer to disconnect the wishbone front ends and mount them on the insides of X members 12. Here two ball and socket joints at 51 (similar to the one described in connection with Fig. 5) are positioned in close proximity and from these joints a straight tube or distance rod 52 terminates in spring supporting plates 37. To accommodate this diagonal and straight construction, driving plates 40 are diagonally welded to the axle 24. It is important to note that the torque or brake reaction forces tilt the axle unit on a substantially horizontal axis and the driving plates, while on an angle, will not be strained as the rubber bushing flanges make this accommodation; further, that by placing the joints 51 in close proximity, substantially all the axle tilting forces will be accommodated by the front connections.

The wishbone tube 52 and therewith integral parts shall be referred to as wishbone or distance rod. For certain applications I might position the joints 51 on the frame side rail (not shown).

Figs. 8 and 9 illustrate a further modification. Here the transmission 16 is provided with a rear extension 53 to shorten the propeller shaft 54 (to three-quarter length), and the wishbone front connection is formed on a bracket 55, secured to the frame, as by welding. A removable side plate 56 is secured by cap screw 57 and bolt 60 passing through rubber bushings 61 imbedded in hub 62, a part of neck 33 and prongs 34 respectively. The removal of plate 56 is provided for the compression of rubber bushings 61. It is important to note that this wishbone front connection is arranged to take the propulsion declaration and tilting of the axle.

Fig. 10 illustrates the adaptation of the described wishbone drive to a two-half propeller shaft construction. Here a steady rest 63 supports the rear end of the front propeller shaft 64. This shaft terminates in a universal joint 65; to it is connected a rear propeller shaft 66. This steady rest serves as the front support for the wishbone as described above. Here the coil spring position as being between the axle and frame is indicated.

The drawings 1 to 10 inclusive indicate a rubber primary support. Obviously this might be replaced with any other sort of bearing material and the rubber reaction support might be replaced with metal springs. However, the applicant prefers the inexpensive rubber supports. In this application the reference to rubber shall mean rubber per se or another yielding material.

What applicant claims as his invention:

1. Suspension means for a drive axle, comprising a frame including X members, an integral power axle, a propeller shaft, a single pair of independent diagonally disposed distance rods between said X members and power axle, rubber-lined connections between said axle and distance rods, rubber-lined connections between said distance rods and X members, said last mentioned connections in laterally spaced relation, whereby a space is created for the oscillation of said propeller shaft.

2. The invention described in claim 1, where coil springs are interposed between the axle and the frame.

3. A substitution for a Hotchkiss drive, comprising a frame including X members, an integral power axle, propeller shaft means, a single pair of independent diagonally disposed distance rods between said X members and power axle, rubber-lined connections between said axle and distance rods, rubber-lined connections between said distance rods and X members, with said last mentioned connections in laterally spaced relation straddling said propeller shaft means.

4. The invention described in claim 3 where coil springs are interposed between the axle and the frame.

5. In a motor vehicle, in combination, a frame; a Hotchkiss type rear axle; a pair of forwardly extending diagonally disposed distance rods controlling the longitudinal position of said axle in relation to said frame, pivotal connections between said rods and said frame, rubber lined connections between said rods and said axle yieldingly controlling the torque and brake reactions, means controlling the lateral position of said axle in relation to said frame, and spring means between said frame and axle, resiliently resisting upward movement of said axle relatively to said frame.

6. The invention described in claim 5, wherein the spring means are coil springs.

7. The invention described in claim 5, wherein the spring means are seated on rearward extensions of the distance rods.

JULES HALTENBERGER.